United States Patent [19]

Laster

[11] Patent Number: 4,516,964

[45] Date of Patent: May 14, 1985

[54] POWER TRANSMISSION CHAIN-BELT

[75] Inventor: Walter R. Laster, Arlington Heights, Ill.

[73] Assignee: Borg-Warner Corporation, Chicago, Ill.

[21] Appl. No.: 497,479

[22] Filed: May 23, 1983

[51] Int. Cl.³ .............................................. F16G 5/18
[52] U.S. Cl. ..................................... 474/245; 474/201
[58] Field of Search ............... 474/245, 242, 244, 240, 474/201, 270, 229, 248

[56] References Cited

U.S. PATENT DOCUMENTS

| | | | |
|---|---|---|---|
| 4,313,730 | 2/1982 | Cole et al. | 474/201 |
| 4,344,761 | 8/1982 | Steuer | 474/245 |
| 4,386,922 | 6/1983 | Ivey | 474/242 |

Primary Examiner—James A. Leppink
Assistant Examiner—Thuy M. Bui
Attorney, Agent, or Firm—Aubrey L. Burgess

[57] ABSTRACT

A power transmission chain-belt, especially adapted to provide a drive and transmit power between the pulley of a pulley transmission, such as a variable ratio pulley transmission. In such each pulley has a pair of flanges, at least one of which is axially movable with respect to the other. The chain-belt is constructed of a plurality of ranks or sets of interleaved links, each rank being joined to the next adjacent rank by pivot means, such as round pins, or a pin and rocker, to permit articulation of the belt. Generally trapezoidal-shaped load blocks are located between the pivot means of each rank or set of links, which blocks have opposite edge surfaces to drivingly contact the flanges of the pulleys. At least one load block has a different width than the other load blocks, so as to contact the flanges of the pulley at a different radial location and different time than the other load blocks. Because of this construction, the generated noise pattern produced when the chain-belt engages the pulley flanges is modified.

6 Claims, 6 Drawing Figures

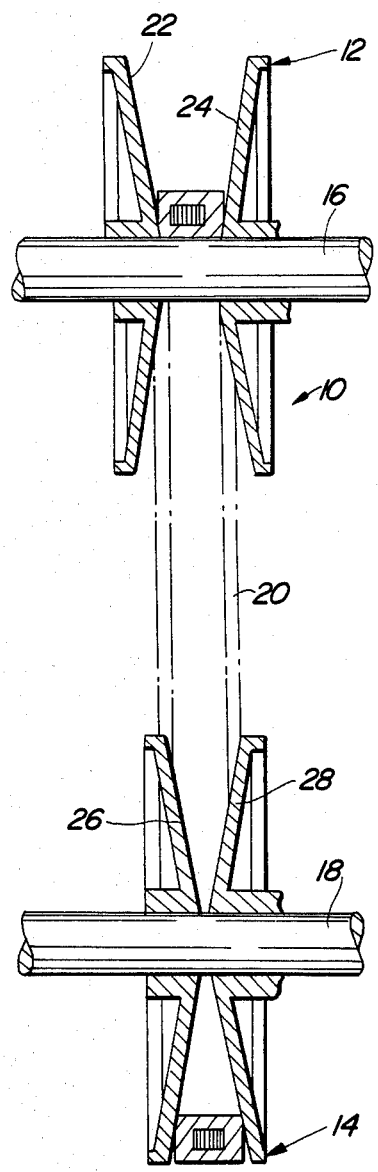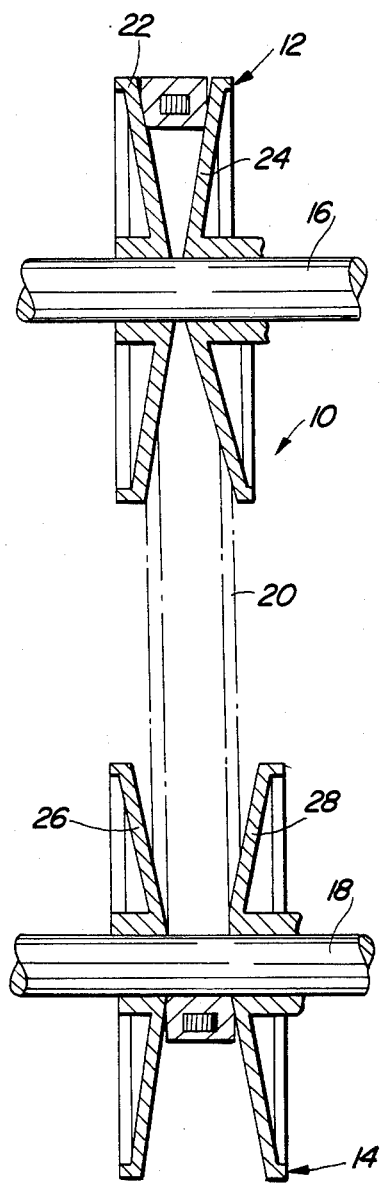

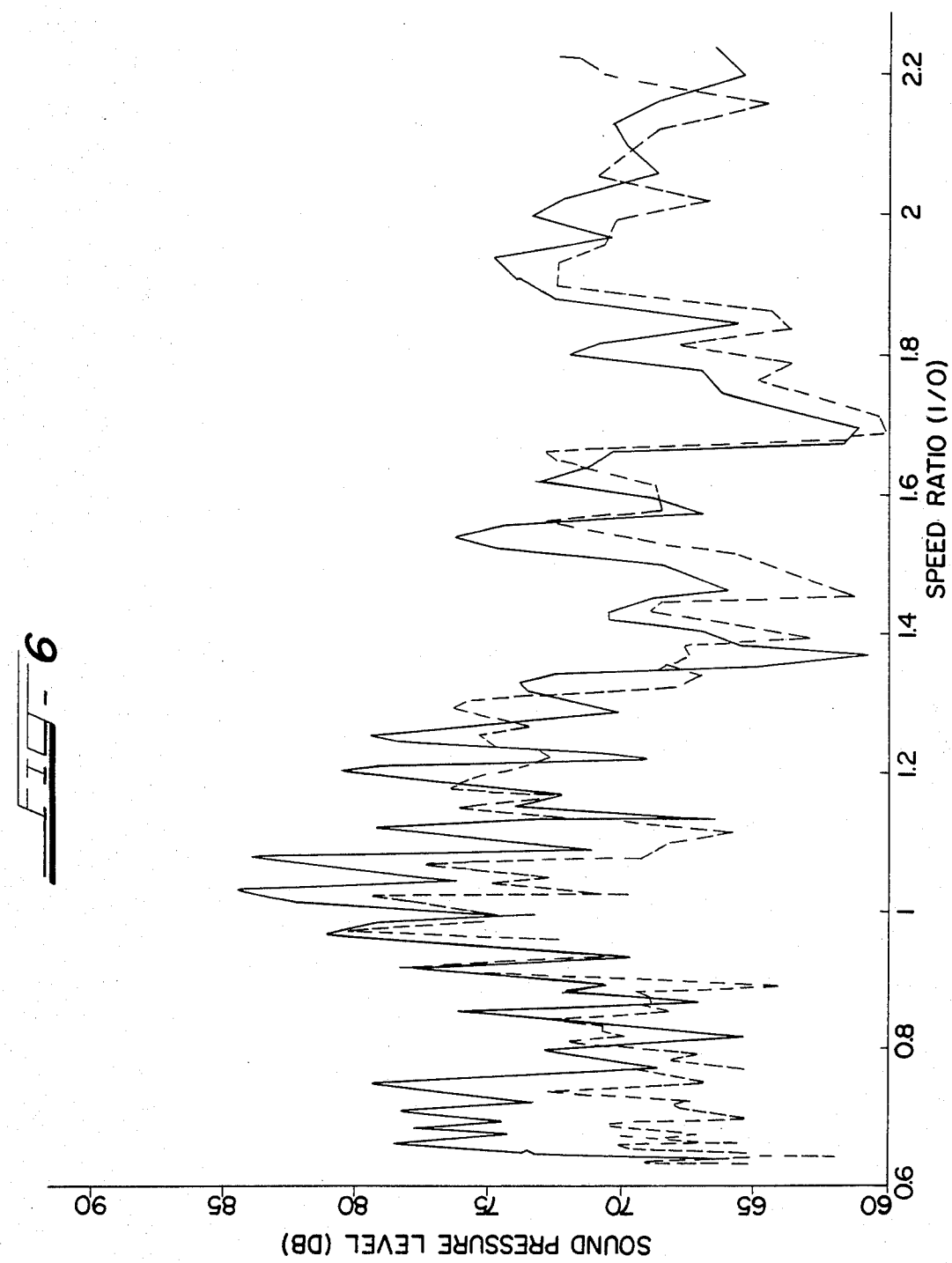

POWER TRANSMISSION CHAIN-BELT

BACKGROUND OF THE INVENTION

Variable pulley transmissions for transferring torque from an input shaft to an output shaft have been used for some time. In such arrangements a first pulley is mounted on the input shaft, and this pulley has at least one flange axially movable relative to its other flange to change the effective pulley diameter. A second, similarly adjustable pulley is mounted on the output shaft. A flexible belt intercouples the two pulleys to transfer torque between them. As the effective diameter of one pulley is changed, and simultaneously the effective diameter of the other pulley is changed in the opposite direction, the drive ratio between the input and output shafts is adjusted in a smooth, continuous manner.

For several decades automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continously variable transmission of the type described above. This has resulted in the production and marketing in Europe of the Daf passenger car, using a flexible rubber belt in such a continuously variable transmission (CVT). Such a belt must be relatively wide because of the torque it must handle, and operates under severe temperature, vibration and other adverse conditions. To improve the belt, efforts have been channeled to produce a flexible belt of metal, and some of these efforts are described in the patent literature. Metal belts can be relatively narrow and possess more load-torque handling capacity than a rubber belt of the same cross-section and, in addition, provide greater efficiency in transmitting torque between the pulleys of the transmission.

A chain belt for a pulley transmission comprising ranks or sets of links interleaved with other sets of links and connected by pivot means, and drive or load blocks of generally trapezoidal shape located between adjacent pivot pins to transmit load to the pins is disclosed and claimed in U.S. Pat. No. 4,313,730, issued Feb. 2, 1982 to Cole et al. In this patent, the drive or load blocks have a centrally located "window" through which links of the chain pass, and angled side edges which drivingly engage the pulley flanges. This belt is of the "pull" or tension type because the drive or load blocks do not move longitudinally along the chain but are constrained by the pivot means.

Another type of metal drive belt for a pulley transmission is taught in U.S. Pat. No. 3,720,113 and comprises a flexible band of matched, nested steel strips or bands on which metal blocks are threaded. The blocks are longitudinally movable on the nested banks. Each of the blocks have tapered edges to engage the flanges of the pulleys of the transmission. Because the individual metal blocks are in compression as they transfer torque between the pulleys, the belt is frequently termed a "push" belt. The projected cost of the described "push" type belts is several times the cost of a "pull" chain-belt as taught by Cole et al because the chain links and the load blocks are stamped from sheet metal and the parts are assembled by automatic machinery. There is no need to match band lengths required for nesting the endless bands of the push type belt. Thus, economically, the Cole et al chain-belt is much more attractive than the belt of U.S. Pat. No. 3,720,113.

One major factor to be considered in using the CVT for automotive use is the noise generated by the engagement of drive blocks and pulley flanges. Noise which "peaks" at certain frequencies in a regular pattern can be disagreeable and annoying to humans. Acoustic research results have proven that a white, irregular or arrhythmic noise is less noticeable and annoying than a noise which contains recognizable pure tones of a single frequency. The most annoying chain noise is the single tone or frequency which may occur above 1000 Hz, and have an amplitude extending above the average amplitude of the noise spectrum by 5 to 10 dB. Some of the prior art chain-belts described may produce a noise spectrum which is annoying to humans.

SUMMARY OF THE INVENTION

The present invention is useful in a chain-belt for drivingly interconnecting the pulleys of a pulley transmission. Such pulleys are constructed of a pair of flanges and in a variable pulley transmission, at least one flange of a pair is axially movable with respect to the other flange of the pair.

An endless chain-belt is constructed of a plurality of ranks or sets of links interleaved with adjacent sets of links, a rank or set of links being a transverse group of links between and encompassing two adjacent pivot means. Each link has a pair of openings, one adjacent each end of the link. The openings at one end of a set of links are aligned with the openings at an end of the next adjacent set of links. Pivot means pass through the aligned openings to join the sets of links and to permit articulation of the assembly. The pivot means can comprise round pins, or sets of pins and rockers, both types of pivot means being well known in the art. Trapezoidal drive or load blocks are located on the ranks of links between adjacent pivot means. When necessary, the drive blocks have tapered front and back surfaces to permit the assembly to encircle or wrap around the pulleys. This is not usually necessary because the drive blocks are spaced along the length of the chain and permit articulation of the assembly. In any event, the drive or load block has a centrally located window through which links pass, and each block has angled side edges to drivingly engage the pulley flanges. Each load or drive block assembly can be a single member or a laminate, made up of several relatively thin parts. In the latter, the parts can be stamped from sheet metal and require little, if any, finishing. A single member can be machined from metal stock or produced by powdered metal techniques.

According to the present invention, the width of at least one drive block assembly in the array of chain and drive blocks is intentionally modified beyond the normal manufacturing tolerances so that, while it still engages the pulley flanges, it does not engage the pulley flanges at the same radial location as do the unmodified drive blocks. This width reduction can be accomplished by manufacturing at least two different width drive blocks, or by assembling a drive chain-belt with uniform width drive blocks, and thereafter grinding off at least one of the drive blocks to reduce its width. Several drive blocks of the different width may be used and arranged in a predetermined pattern in the drive belt. The different width drive blocks can also be randomly distributed throughout the length of the belt. Also, where desirable, various mixtures of different widths of load blocks can be used throughout the length of the belt, so long as they contact the pulley flanges.

The generated operational noise pattern of a chain-belt modified in the manner disclosed above makes the chain-belt acceptable (from an acoustic standpoint) for use in the automotive industry.

BRIEF DESCRIPTION OF THE DRAWINGS

FIGS. 1 and 2 are schematic illustrations of a variable pulley transmission in different drive ratios;

FIG. 6 is a graph comparing the sound levels in dB's for varying speed ratios of a prior art chain-belt and the chain-belt of this invention.

DETAILED DESCRIPTION OF THE PREFERRED EMBODIMENT

Figure 3:
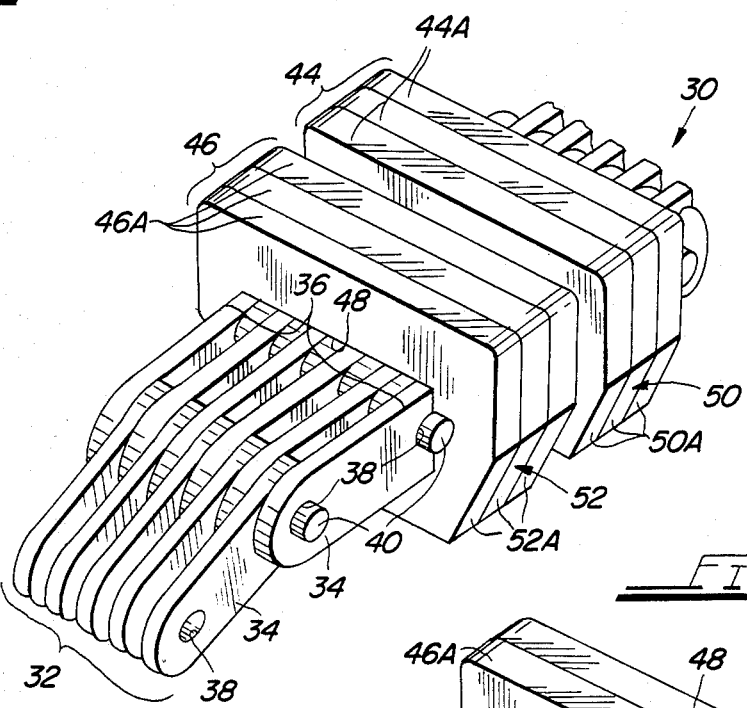
FIG. 3 is a perspective illustration of a portion of a chain-belt constructed according to this invention.

FIGS. 1 and 2 illustrate schematically a variable pulley transmission 10 comprising a pair of spaced pulleys 12 and 14 mounted on generally parallel shafts 16 and 18. The pulleys are interconnected by an endless transmission belt 20. Pulley 12 comprises pulley flanges 22 and 24 and pulley 14 comprises pulley flanges 26 and 28. At least one flange of each pulley is axially movable with respect to the other to vary the drive ratio between pulleys 12 and 14. FIGS. 1 and 2 illustrate the extremes of drive ratios between the pulleys. One or the other of the shafts can be designated as the drive shaft and connected to a source of power (not shown); the other shaft is designated as the driven shaft and is connected to the load which is to be driven, as for example, the wheels of an automobile (not shown).

Drive-chain or chain-belt 30 of this invention, a portion of which is illustrated in FIG. 3, is connected in an endless loop of a length suitable to drivingly interconnect pulleys, such as pulleys 12 and 14 of a variable pulley transmission, as schematically illustrated in FIGS. 1 and 2, it being understood that chain-belt 30 can be used to drivingly interconnect pulleys in any pulley transmission system.

The drive chain-belt 30 comprises a plurality of ranks or sets 32 of links 34 interleaved with adjacent sets 36 of links also made up of links 34. Sets 36 contain one more link than sets 32 because they include the outermost links of the chain. Each link has a pair of spaced apertures 38 adjacent their ends with the apertures at one end of the links being aligned with the apertures at one end of the interleaved set of links. A pivot means 40, shown as a round pin, is recieved in the aligned apertures to connect the sets of links together and to permit articulation of chain-belt 30. Other types of pivot means, such as pins and rockers, known in the art, can be used.

To drivingly engage the flanges of the pulleys of a pulley transmission, such as flanges 22, 24 and 26, 28 of pulleys 12 and 14, FIG. 1, load block assemblies, such as assemblies 44 and 46 in FIG. 3 are used. Each assembly encircles a set of links between adjacent pivot means. For ease of manufacture, each load block 44 and 46 can be an array of several plates, each block shown here as comprising three plates. The plates are identified as 44A and 46A, respectively. The number of plates can be more or less than three without departing from the spirit of the invention. As such, the plates can be stamped from sheet metal using known stamping techniques and require little, if any, additional finishing. Solid, one piece load blocks can also be used; generally they are more expensive to manufacture. Each load block assembly 44 or 46 has a rectangular window 48 permitting it to be assembled over a set of links.

Each load block 44 and 46 is generally trapezoidal in appearance, when viewed from the front, and has angled edge surfaces 50 and 52, respectively, adapted to drivingly engage the angled pulley flanges. Each edge surface constitutes surfaces 50A or 52A, as the case may be.

In accordance with this invention, the chain-belt 30 is constructed with load block assemblies 44 and at least one load block assembly 46. The width of load block assembly 46 measured between the pulley-contacting surfaces, the dimension from side-to-side, is different from the width of the other load block assemblies in the array of interconnected links and load block assemblies in the chain-belt assembly. Generally, there are several load block assemblies 46 in the chain-belt assembly.

Figure 4:
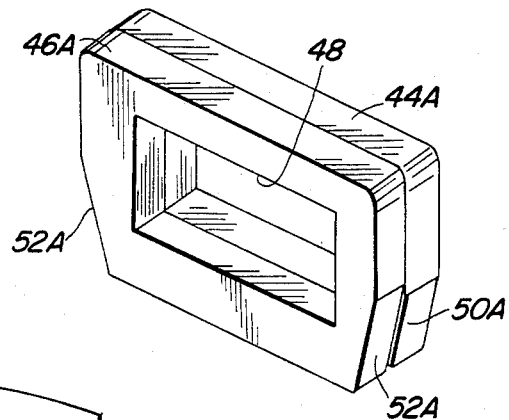
FIG. 4 is a perspective view of a pair of load block plates usable in the chain-belt of FIG. 3 which have been placed face to face with one another to show their different widths measured at the pulley contacting locations.

To illustrate the difference between load block assemblies 44 and 46, FIG. 4 shows a pair of load block plates 44A and 46A, the plate 46A being the front plate. It can be observed that plate 46A is narrower at its pulley contacting surfaces 52A that is load block plate 44A at 50A. In a chain-belt assembly, a load block assembly constructed entirely of plates 44A will contact the pulley flanges of a pulley transmission at a different radial zone than do the surfaces of another load block assembly constructed entirely of plates 46A. When the zone of impact of one or more (but less than all) load block assemblies with the pulley flanges is different from other load blocks, the resultant noise spectrum becomes less objectionable for use in automobiles.

To accomplish the improvements of this invention, at least two different width load blocks are manufactured and assembled with a chain, either in a predetermined pattern or in a random mixture. Chain-belts according to this invention can also be manufactured by assembling uniform width load blocks on the sets of links and thereafter grinding the pulley contacting surfaces of at least one load block in the chain-belt, so as to change the width of that one load block.

Figure 5:
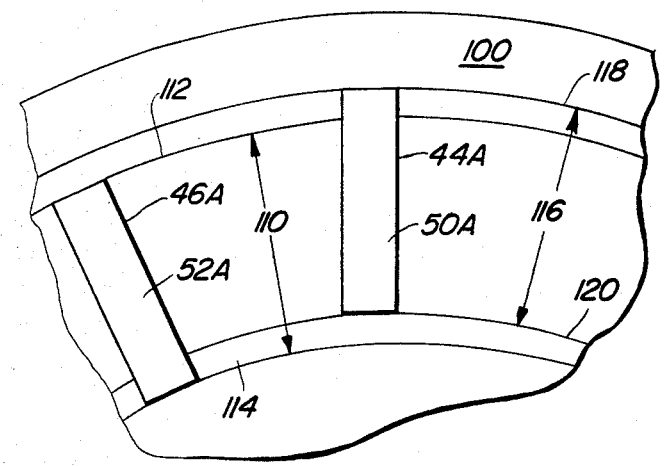
FIG. 5 is a schematic illustration showing how the pulley engagement of load blocks of FIG. 4 can differ from one another.

To further illustrate the invention, FIG. 5 shows a portion of a pulley flange surface 100. Superimposed on surface 100 are load block pulley engaging surfaces 50A and 52A of load block plates 44A and 46A. Surface 52A engages flange surface 100 along a conical surface portion 110 bounded by a pair of arcs 112, 114, while surface 50A engages flange surface 100 along a conical surface portion 116 bounded by a pair of arcs 118, 120. Surface portion 110 is located radially inward of surface portion 116, because a load block assembly constructed entirely of plates 46A is of less width than a load block assembly constructed entirely of plates 44A.

The maximum amount of block removal to insure pulley flange contact of a reduced width block is determined by using the formula:

$$b = (p^2/r) \tan B,$$

where
b is the amount (linear dimension) of width reduction,
p = pitch of the chain links, i.e., the distance between the centers of the next adjacent pivot means,
B = angle between the pulley flanges, and
r = maximum operating radius of the belt on the pulley flange.

The use of a chain-belt constructed according to the invention has been found to modify the noise pattern generated in previous variable pulley transmissions by the regular impact of the uniform load blocks against the flanges of the pulleys. The predominant frequency (f) of the noise generated by the impact of the load blocks against the pulley flanges is:

$$f = J/P$$

where J is the chain-belt velocity in feet/second, and P is a constant proportional to pulley load block width.

By constructing a chain-belt according to this invention, P is no longer fixed. Thus there is no single frequency which dominates the noise spectrum; rather the noise spectrum includes more than one frequency, and the effect on the human ear is much less objectionable than when P is fixed.

It is known in the art that the pitch line (a line drawn through the centers of the successive pivot means) of a rigid link chain turning on a drive sprocket is polygonal rather than circular, and its engagement action is inherently one of impact with the teeth of the drive sprockets. The path of the chain in relatiion to the sprocket gives rise to what is termed "chordal action", i.e., the pitch line traverses a radial path as well as a longitudinal path as it enters the sprockets. This "chordal action" is also present when a chain-belt is used in a pulley transmission, and the impact of the belt and pulleys gives rise to the undesirable noise peaks. The modifications taught by this invention in the pulley engaging width of the drive blocks modifies the contact location of at least one load block with the pulley flanges which changes the timing of the impact of the blocks and the pulleys. The resultant noise pattern has been found to be less offensive to the human ear than the unmodified noise pattern.

FIG. 6 is a graph of sound level in dB's plotted against speed ratio and compares the performance of a prior art belt (solid line) and an improved belt (broken line) constructed according to this invention. Each belt was constructed of 90 sets of interleaved links joined by round pins as pivot members, each link having a pitch of 0.265 inch (the distance between centers of adjacent pivot members). A load block was positioned between each pair of adjacent pivot means. Each load block was a laminate of three members. Each chain-belt tensioned at 200 psi line pressure, interconnected a pair of variable pulleys, one of which was driven by an electric motor at a speed of 250 rpm. The speed ratio between the pulleys was varied between 0.60 and 2.20.

The width of 12 load blocks in one chain were reduced by 0.003 inch on each side, while the other prior art chain had all load blocks of the same width. The twelve reduced width load blocks in the chain constructed according to this invention were randomly disposed along the length of the chain-belt. The sound level for the prior art belt peaked at about 85 dB, while the sound level for the belt constructed according to this invention peaked at about 80 dB. In general at all speed ratios, the sound level of the belt constructed according to this invention was less than that of the prior art belt.

In a chain-belt constructed according to this invention, the load blocks, links and pins are generally constructed of carbon steels, and the pins are usually heat treated to increase their strength.

When the expressions "load block assemblies" or "load blocks" are used herein and in the appended claims, it means an assembly or a plurality of plates or a single member, each assembly or block being the one located between the next adjacent pivot means.

The appended claims are intended to cover all reasonable equivalents of this invention.

I claim:

1. A chain-belt for drivingly connecting the pulleys of a pulley transmission, each pulley having a pair of flanges, said chain-belt comprising a plurality of sets of links interleaved with other sets of links, each link having a pair of spaced apertures, the apertures in one set of links being transversely aligned with the apertures of the next adjacent set of links which is interleaved therewith to form groups of aligned apertures, pivot means positioned in each group of aligned apertures both to join said sets of links and to permit articulation of the chain-belt, and a generally trapezoidal-shaped load block transversely surrounding each set of links and positioned between the adjacent pivot means, each load block having angled side surfaces adapted to drivingly contact the flanges of said pulleys at least one of said load blocks having a different transverse width than the transverse width of others of said load blocks, so as to drivingly contact the pulley flanges at a different time and different radial location than do the other load blocks.

2. A chain-belt as recited in claim 1, in which said one load block has its angled surfaces ground so that the width thereof is less than the width of said other load blocks.

3. A chain-belt as recited in claim 1, and further comprising a plurality of load blocks of said different width, randomly located along the length of said chain-belt.

4. A chain-belt as recited in claim 1, and further comprising a mixture of load blocks of different widths randomly located along the length of said chain-belt.

5. A method for producing an improved chain-belt to drivingly engage the flanges of pulleys in a pulley transmission and constructed of a plurality of sets of links interleaved with adjacent sets of links, each link having an aperture adjacent each end, and the sets of links having transversely aligned apertures with the interleaved sets of links to form groups of apertures, pivot means passing through each group of apertures, and a load block surrounding each set of links positioned between adjacent pivot means, each load block having a width defined at least in part by angled edge surfaces generally complementary to the pulley flanges, comprising the steps of;
   a. arranging links as sets;
   b. interleaving adjacent sets of links;
   c. assembling a load block over each set of links;
   d. joining adjacent sets of links by passing a pivot means through a group of apertures;
   e. continuing steps b, c, and d until an endless chain-belt is produced; and
   f. grinding off the tapered edges of at least one load block.

6. A method for producing an improved chain-belt to drivingly engage the flanges of pulleys for use in a pulley transmission and of a plurality of sets of links interleaved with adjacent sets of links, each link having an aperture adjacent each end, and the sets of links having transversely aligned apertures with the interleaved sets of links to form groups of apertures, comprising the steps of:

a. forming a plurality of load blocks of at least two different transverse widths to provide a supply thereof;
b. arranging links as sets;
c. interleaving adjacent sets of links;
d. assembling a load block from the supply of load blocks of at least two different transverse widths over each set of links;
e. joining adjacent sets of links by passing a pivot means through a group of apertures; and
f. continuing steps c, d and e until an endless chain-belt is produced.

* * * * *